United States Patent
Nakayama et al.

(10) Patent No.: US 7,349,451 B2
(45) Date of Patent: Mar. 25, 2008

(54) HARMONIC PULSE LASER APPARATUS, AND METHOD FOR GENERATING HARMONIC PULSE LASER BEAMS

(75) Inventors: Shin-ichi Nakayama, Chiba-ken (JP);
Takahiro Nagashima, Chiba-ken (JP);
Junpei Kase, Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 414 days.

(21) Appl. No.: 11/039,808

(22) Filed: Jan. 24, 2005

(65) Prior Publication Data
US 2005/0163174 A1  Jul. 28, 2005

(30) Foreign Application Priority Data
Jan. 23, 2004  (JP) .............................. 2004-016293

(51) Int. Cl.
*H01S 3/10* (2006.01)
*H01S 3/13* (2006.01)

(52) U.S. Cl. .............................. 372/21; 372/22; 372/30
(58) Field of Classification Search .................. 372/21, 372/22, 30
See application file for complete search history.

(56) References Cited

U.S. PATENT DOCUMENTS

| | | | | |
|---|---|---|---|---|
| 5,142,542 A | * | 8/1992 | Dixon ........................ | 372/22 |
| 2004/0131092 A1 | * | 7/2004 | Nakayama et al. ........... | 372/21 |

* cited by examiner

*Primary Examiner*—Armando Rodriguez
(74) *Attorney, Agent, or Firm*—Wenderoth, Lind & Ponack, L.L.P.

(57) ABSTRACT

A KTP crystal is irradiated by a long-pulse fundamental wave pulse laser beam having a pulse width of 100 µs or longer typically output from a solid-state pulse laser such as a YAG pulse laser. In the KTP crystal, wavelength conversion is performed to generate a second harmonic pulse laser beam with a two times higher frequency, which long-pulse second harmonic pulse laser beam is in turn output for laser processing such as welding etc.

9 Claims, 6 Drawing Sheets

HARMONIC PULSE LASER APPARATUS, AND METHOD FOR GENERATING HARMONIC PULSE LASER BEAMS

BACKGROUND OF THE INVENTION

1. Field of the Invention

The present invention relates generally to a technology for wavelength conversion from a fundamental wavelength laser beam to a harmonic light beam and, more particularly, to a method and apparatus for generating a long-pulse harmonic pulse laser beam suited for laser processing such as welding etc.

2. Description of the Related Art

Recently, a laser is have been utilized in fields of manufacturing, especially welding, cutting and surface finishing. In fact, laser welding technology is increasingly becoming important because highly accurate and high speed processing can be achieved; a workpiece is affected by less thermal strain; and advanced automation can be enabled. Currently, a solid laser is used most frequently for laser welding and is a YAG laser which generates a light beam with a wavelength of about 1 μm. The YAG laser comprises a YAG ($Y_3Al_5O_{12}$) crystal doped with rare earth active ions (such as $Nd^{3+}$, $Yb^{3+}$ and the like) and a fundamental wavelength of Nd:YAG laser is 1064 nm. The YAG laser enables continuous oscillation and giant pulse oscillation with Q switch to be achieved and can generate a long-pulse laser beam with a pulse width of more than 100 μs (typically, 2 to 3 ms).

By the way, in the laser welding, optical coupling between a welded material and a laser beam is important. Without good optical coupling, since reflectance becomes higher and absorption efficiency of laser energy becomes lower, it is difficult to obtain a good welding connection. In this regard, the YAG laser beam with a fundamental wavelength (e.g. 1064 μm) has poor optical associativity to copper, gold, aluminum and the like. To these metals, it is known that a second harmonic (532 nm) YAG laser has higher optical coupling. In a patent document 1, the applicant has disclosed a different wave length superimposed laser welding method which generates the fundamental wavelength (1064 nm) YAG pulse laser beam with a first YAG laser as well as generates the second harmonic (532 nm) Q switch YAG laser beam with a second YAG laser to coaxially superimpose and irradiate the fundamental wave YAG pulse laser beam and the second harmonic Q switch YAG laser beam on welded material. According to this different wave length superimposed laser welding method, for the welded material such as copper, gold, aluminum and the like, absorption efficiency of laser energy can be enhanced to obtain good welding connection (see, e.g., Japanese Patent Application Laid-Open Publication No. 2002-28795).

However, in the different wave length superimposed laser welding method described above, since two (2) YAG laser systems are required, it is problematic that a laser apparatus becomes larger and adjustment and maintenance become complicated.

SUMMARY OF THE INVENTION

The present invention was conceived in consideration of the above problems of the prior art, and it is therefore an object of the present invention to provide a harmonic pulse laser apparatus and harmonic pulse laser generation method which generate long-pulse harmonic pulse laser beams from one (1) solid-state laser.

Another object of the present invention is to provide a harmonic pulse laser apparatus and harmonic pulse laser generation method which stably generate a high-power long-pulse harmonic pulse laser beam with high wavelength conversion efficiency.

First, a description will be given of how the inventors have reached the present invention.

Injecting (radiating) high-intensity laser beam to a nonlinear optical crystal generates light with a two or three times higher frequency than the incident light, i.e. harmonic light, due to optical nonlinear effect. These nonlinear optical crystals are also referred to as wavelength conversion crystals and, as illustrated in Table 1, various wavelength conversion crystals are known.

TABLE 1

| Wavelength Conversion Crystals | Laser Damage Threshold | | |
|---|---|---|---|
| | $t_p$ (ns) | $GW/cm^2$ | λ (nm) |
| ADP | 60.0 | 0.5 | 1060 |
| CDA | 10.0 | 0.5 | 1060 |
| CD*A | 12.0 | 0.36 | 1060 |
| KDP | 0.2 | 17.0 | 530 |
| | 20.0 | 0.4 | 694 |
| | 0.2 | 23.0 | 1060 |
| KD*P | 10.0 | 0.5 | 1060 |
| RDP | 10.0 | 0.2 | 694 |
| | 12.0 | 0.3 | 1060 |
| RDA | 10.0 | 0.35 | 694 |

In order to provide the high-intensity laser beam to this kind of wavelength conversion crystals, conventionally, a Q switch scheme has been utilized. According to the Q switch scheme, after sufficiently exciting a laser active medium such that population inversion of energy level becomes as high as possible, by turning on a Q switch and making a Q value of a resonator high drastically, instantaneous large oscillation occurs in the resonator and laser output with a narrow pulse width and a high peak power can be obtained. The Q switch laser light generated by the Q switch type laser apparatus is referred to as a giant pulse.

Generally, when applying a high-power laser beam (for example, the second harmonic laser beam with a frequency two times higher than incident wave or fundamental wave) generated by wavelength conversion with the wavelength conversion crystals to processing and the like, the most important characteristic value is a laser damage threshold. Even if a nonlinear optical constant deciding the conversion efficiency is high, when the damage threshold is low, the laser beam becomes impractical. This is because, when a laser beam with a peak energy density (usually, in units of $GW/cm^2$) higher than the damage threshold, damages (mostly cracks) are generated in the wavelength conversion crystals and the wavelength conversion crystals can no longer be used.

Conventionally, LBO ($LiB_3O_5$) is a wavelength conversion crystal most frequently used for the wavelength conversion of high-power giant pulse generated by the Q switch type laser into the second harmonic (SHG: second harmonic generation), and the damage threshold thereof (18.9 $GW/cm^2$) is sufficiently high. On the other hand, although KTP ($KTiOPO_4$) crystals are also known as this type of wavelength conversion crystals, the damage threshold of KTP crystals (4.6 $GW/cm^2$) is about four (4) times smaller than that of LBO, which is considerably low, as shown in Table 2.

TABLE 2

| Items | LBO | KTP |
|---|---|---|
| Crystal Structure | Tetragonal System | Orthorhombic System |
| Damage Threshold | 18.9 GW/cm$^2$ | 4.6 GW/cm$^2$ |
| Thermal Conductivity Coefficient | 3.5 W/mK | 13 W/mK |
| Absorption Coefficient | (0.1%/cm @ 1064 nm (0.3%/cm @ 532 nm | (0.05%/cm @ 1064 nm (1%/cm @ 532 nm |
| Thermal Expansion Coefficient | $\alpha_x = 108 \times 10^{-6}$/K $\alpha_y = -88 \times 10^{-6}$/K $\alpha_z = 34 \times 10^{-6}$/K | $\alpha_1 = 8.7 \times 10^{-6}$/K $\alpha_2 = 10.5 \times 10^{-6}$/K $\alpha_z = -0.2 \times 10^{-6}$/K |

In this sense, the LBO crystal was a preferred material as a wavelength converter for the Q switch YAG laser described in the above patent document 1 (Japanese Patent Application Laid-Open Publication No. 2002-28795). On the contrary to this, the KTP crystal was inappropriate as the wavelength conversion crystal unless peak energy (a peak value energy density) of the fundamental wave giant pulse was equal to or less than a certain degree, i.e., equal to or less than the damage threshold of the KTP crystal. In other words, by making the peak value energy density of the fundamental wave giant pulse equal to or less than the damage threshold of the KTP crystal, the second harmonic laser beam can be generated from the KTP crystal, without giving damage such as gray tracking (also referred to as darkening, a phenomenon making crystals turn black) to the KTP crystal. However, the second harmonic laser beam in this case has lower laser power and has a limitation in that the laser beam can not possess sufficient processing ability depending on processing targets.

In view of the above points, in order to research and develop a harmonic pulse laser apparatus of the present invention, for LBO crystals which are high-power wavelength conversion crystals with a relatively high damage threshold, SHG (second harmonic) generation experiments were performed by radiating long-pulse (100 μs or longer, typically 1 to 3 ms) laser beams with relatively long pulse width, which had fundamental wavelength of 1064 nm, generated by YAG pulse laser.

Unfortunately, the LBO crystals were affected by cracking and were made unusable. Although the reason is not completely clear, it is believed that the cracking is generated because of thermal expansion/contraction characteristics which the LBO crystals have, though the damage threshold conditions are cleared. More specifically, since the thermal expansion coefficient of the LBO crystals have strong anisotropy, have a considerable expansion rate of $\alpha_x=108\times 10^{-6}$/K in x-axis direction and have a considerable contraction rate of $\alpha_x=-88\times 10^{-6}$/K in y-axis direction, it is estimated that a considerable degree of thermal stress is locally generated within the LBO crystals on which the 100 μs or longer, typically 1 to 3 ms, long-pulse laser beam is incident or injected and, as a result, the cracking is formed.

Along with several other experiments, for KTP crystals which are low-power wavelength conversion crystals with relatively low damage threshold, SHG (second harmonic) generation experiments were performed by radiating long-pulse (100 μs or higher, typically 1 to 3 ms) laser beams with relatively long pulse width, which had a fundamental wavelength of 1064 nm, generated by a YAG pulse laser.

Surprisingly, the gray tracking was not generated in the KTP crystals and the second harmonic (wavelength 532 nm) pulse laser beams could be generated without forming the cracking. Although the reason is not clear, it is believed as follows. The long-pulse fundamental wave YAG pulse laser beams typically have energy per pulse on the order of several joules, which is far from small, however, the peak value or peak energy thereof (typically, on the order of several kW) is significantly lower than that of the giant pulse, and the energy density thereof does not exceed the damage threshold of the KTP crystals based on the Q switch or giant pulse (4.6 GW/cm$^2$). On the other hand, the fundamental YAG pulse laser has sufficient laser power for generating required nonlinear optical effect on the KTP crystals. Further, it is believed that, even if the long-pulse fundamental wave YAG pulse laser beam was provided, the problematic thermal stress was not generated and the cracking was not formed in the KTP crystals due to low thermal expansion rate thereof.

The present invention was conceived based on the above knowledge. That is, a method of generating harmonic pulse laser beams of the present invention comprises the steps of exciting an active medium of a solid-state laser to generate a fundamental wave pulse laser beam with a fundamental frequency that has a pulse width of 100 μs or longer; and applying the fundamental wave pulse laser beam to a KTP (KTiOPO$_4$) crystal to generate a second harmonic pulse laser beam that has two (2) times the frequency of the fundamental wave pulse laser beam.

A harmonic pulse laser apparatus of the present invention comprises, as its basic configuration, a solid-state laser generating a fundamental wave pulse laser beam with a fundamental frequency that has a pulse width of 100 μs or longer, and a KTP (KTiOPO$_4$) crystal into which the fundamental wave pulse laser beam is injected to generate a second harmonic pulse laser beam that has two (2) times the frequency of the fundamental wave pulse laser beam.

In a preferred aspect of the present invention, the active medium is selected from a group consisting of Nd:YAG, Nd:YLF, Nd:YVO$_4$ and Yb:YAG, and is excited or pumped by an excitation unit.

As a preferred aspect of the present invention, a polarization element allowing passage of light in only one polarization direction may be disposed on a light path of the fundamental wave pulse laser beam such that the polarization direction forms an angle of 45 degrees relative to an optical axis of the KTP crystal, with the KTP crystal being injected by the fundamental wave pulse laser beam linearly polarized by the polarization element.

According to the above configuration, since nonlinear optical effect is affected by two (2) equal-intensity fundamental wave light components which are apparently orthogonal on a coordinate system of the KTP crystal, high-efficiency type II wavelength conversion is enabled and the stable and high-power long-pulse second harmonic pulse laser beam can be generated. The KTP crystal is preferably cut at a type II phase matching configuration.

A harmonic pulse laser apparatus according to a preferred aspect of the present invention comprises an optical resonator having a first and a second end mirror disposed optically opposed to each other; an active medium disposed on a light path of the optical resonator; an excitation unit pumping the active medium to generate a fundamental wave pulse laser beam with a fundamental frequency that has a pulse width of 100 μs or longer; a KTP crystal disposed on the light path of the optical resonator to generate a second harmonic pulse laser beam that has two (2) times the frequency of the fundamental wave pulse laser beam; and a harmonic separator output mirror disposed on the light path of the optical resonator, wherein the harmonic separator output mirror holds the fundamental wave pulse laser beam on the light path of the optical resonator and delivers the second harmonic pulse laser beam to the outside of the light path of the optical resonator.

Preferably, in the harmonic pulse laser apparatus, the active medium is disposed nearer to the first end mirror and the KTP crystal is disposed nearer to the second end mirror, the first end mirror reflects the fundamental wave pulse laser beam toward the active medium, and the second end mirror reflects both the fundamental wave pulse laser beam and the second harmonic pulse laser beam toward the KTP crystal.

As a preferred aspect, the active medium and the KTP crystal may be arranged in the same straight line with respect to each other.

As another preferred aspect, the harmonic separator output mirror may be disposed oblique relative to the light path of the optical resonator between the active medium and the KTP crystal, the harmonic separator output mirror allowing the fundamental wave pulse laser beam to be transmitted therethrough and reflecting the second harmonic pulse laser beam toward a predetermined direction.

According to another preferred aspect, a first end mirror, a second end mirror and a harmonic separator output mirror are arranged in a triangular form; an active medium is disposed between the second end mirror and the harmonic separator output mirror, a KTP crystal is disposed between the first end mirror and the harmonic separator output mirror; and the harmonic separator output mirror is configured such that the fundamental wave pulse laser beam is reflected and the second harmonic pulse laser beam is transmitted therethrough.

A harmonic pulse laser apparatus according to another preferred aspect of the present invention has an optical resonator having an end mirror and a harmonic separator output mirror arranged optically opposed to each other, an active medium disposed nearer to the terminal mirror on a light path of the optical resonator, an excitation unit optically pumping the active medium in order to generate a fundamental wave pulse laser beam with a fundamental frequency which has a pulse width of 100 µs or longer and a KTP crystal disposed nearer to the higher harmonic separate output mirror on the light path of the optical resonator in order to generate the second harmonic pulse laser beam which has two (2) times the frequency of the fundamental wave pulse laser beam, wherein the harmonic separator output mirror confines the fundamental wave pulse laser beam on the light path of the optical resonator and outputs the second harmonic pulse laser beam to the outside of the light path of the optical resonator.

In the configuration of the above harmonic pulse laser apparatus, as a preferred aspect, a harmonic mirror may be provided, which allows the fundamental wave pulse laser to be transmitted therethrough and reflects the second harmonic pulse laser beam.

Also, in a preferred aspect, the excitement unit has an excitation light generation unit generating an excitation light for optically pumping the active medium, a laser power supply unit supplying electric power for making the excitation light generation unit generate the excitation light and a control unit for controlling the electric power supplied to the excitation light generation unit from the laser power supply unit. The excitation light generation unit may be an excitation lamp or a laser diode.

Also, according to a preferred aspect, the laser power supply unit has a direct-current power source unit outputting direct currents and a switching element connected between the direct-current power source unit and the excitation light generation unit, and supplies the excitation light generation unit with pulsed electric power by making the switching element perform a switching operation at high frequency during a period corresponding to the pulse width of the fundamental wave pulse laser beam.

Also, according to a preferred aspect, the control unit generates a control signal for making the switching element perform the switching operation, preferably in a pulse width control scheme, and supplies the control signal to the laser power supply unit.

Also, according to a preferred aspect, the control unit has a harmonic laser output power measurement unit for measuring laser power of the second harmonic pulse laser beam and generates the control signal by feeding back a laser power measurement value obtained from the higher harmonic laser output power measurement unit.

Also, according to a preferred aspect, the control unit has an upper limit setup unit for setting a desirable upper limit of a certain parameter selected from a group of electric power, current and voltage supplied to the excitation light generation unit from the laser power supply unit, a parameter measurement unit for measuring the parameter and a first comparison unit for comparing a parameter measurement value obtained from the parameter measurement unit with the upper limit, and controls the electric power supplied to the excitation light generation unit from the laser power supply unit depending on the comparison result of the first comparison unit.

Also, according to a preferred aspect, the control unit has a fundamental wave laser output power measurement unit for measuring laser output power of the fundamental wave pulse laser beam, and generates the control signal by feeding back a laser output power measurement value obtained from the fundamental wave laser output power measurement unit.

According to a preferred aspect, the control unit includes a limit value setup unit setting at least one of a desirable upper limit and lower limit of laser power of the second harmonic pulse laser beam as a limit value; a harmonic laser power measurement unit measuring the laser power of the second harmonic pulse laser beam; and a second comparison unit for comparing a laser power measurement value obtained from the harmonic laser power measurement unit with the limit value, wherein the control unit controls the electric power supplied to the excitation light generation unit from the laser power supply unit, depending on the comparison result of the second comparison unit.

According to a preferred aspect, the control unit includes a reference value setup unit setting a desirable reference value of the laser power of the second harmonic pulse laser beam; a harmonic laser power measurement unit measuring the laser power of the second harmonic pulse laser beam; a laser power average value calculation unit finding a temporal average value of the laser power measurement values obtained from the harmonic laser power measurement unit; and an offset value calculation unit finding a difference between a laser power average value obtained from the laser power average value calculation unit and the reference value as an offset value, wherein the control unit corrects the control signal depending on the offset value.

According to a preferred aspect, a workpiece is welded by the second harmonic pulse laser beam. In other instances, heat may be generated in a workpiece with the second harmonic pulse laser beam generated by the harmonic pulse laser apparatus of the present invention, to perform alteration of material characteristic of the workpiece, forming of the workpiece or material removal from the workpiece.

According to the present invention, due to the above configuration and effect, a long-pulse harmonic pulse laser beam can be generated from one (1) solid laser. Moreover, a high-power long-pulse harmonic pulse laser beam can be stably obtained with high wavelength conversion efficiency.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Preferred embodiments of the present invention will now be described with reference to the accompanying drawings.

Figure 1:
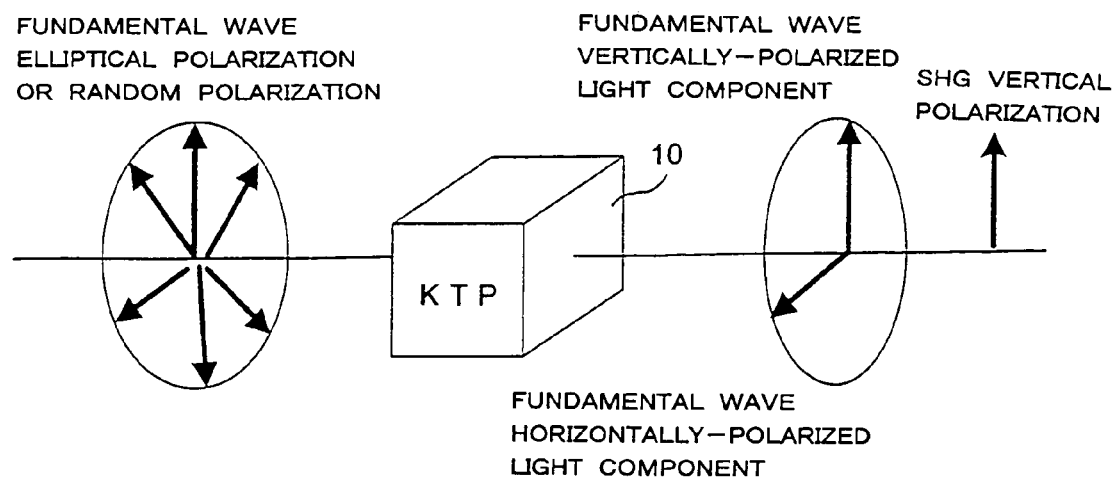
FIG. 1 shows an example of a wavelength conversion method of the present invention.

FIG. 1 shows an example of a wavelength conversion method of the present invention. This method uses a KTP crystal 10 cut at a type II phase-matched angle and performs wavelength conversion from a fundamental wave to a second harmonic with the type II phase matching. More specifically, the KTP crystal 10 is injected in the form of elliptical polarization (preferably, circular polarization) or random polarization by a fundamental wave pulse laser beam (e.g., 1064 nm) which is a pulse with 100 μm or longer pulse width (hereinafter, referred to as "long-pulse") generated by a solid-state pulse laser, for example, a YAG pulse laser (not shown). Then, out of the incident light, only a vertically polarized light component and a horizontally polarized light component of fundamental wave light are transmitted therethrough the KTP crystal 10 as linearly-polarized light. The KTP crystal 10 is optically coupled with the fundamental wave and generates a long-pulse second harmonic pulse laser beam SHG (532 nm) which is linearly polarized in the same direction as the vertically-polarized light component of the fundamental wave light, due to the nonlinear optical effect.

In the wavelength conversion method of FIG. 1, if polarization distribution of the fundamental wave pulse laser beam has biases or anisotropy, the wavelength conversion efficiency may be reduced and the laser power of the second harmonic pulse laser beam SHG may be lowered or fluctuated.

Figure 2:
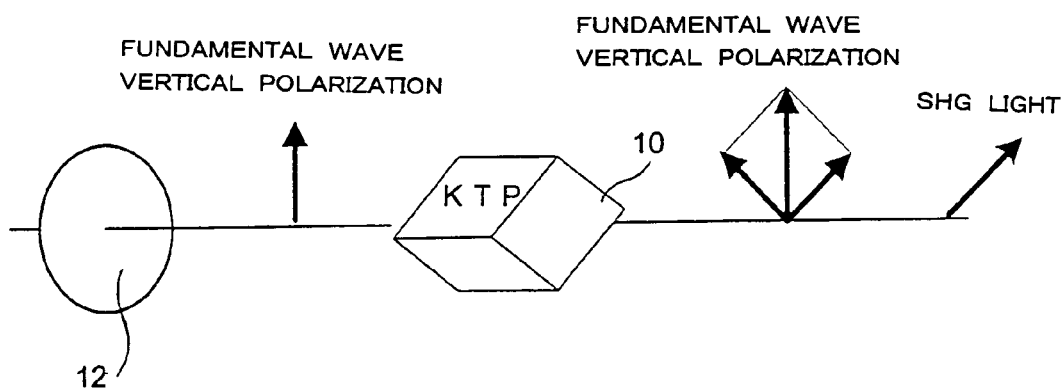
FIG. 2 shows another example of the wavelength conversion method of the present invention.

FIG. 2 shows another example of the wavelength conversion method of the present invention. In this wavelength conversion method, a polarization element 12 allowing passage of light in only one polarization direction is disposed such that the polarization direction forms an angle of 45 degrees relative to an optical axis of the KTP crystal 10, and the KTP crystal 10 is injected by the long-pulse fundamental wave pulse laser beam linearly polarized by the polarization element 12. As the polarization element 12, a polarizer or Brewster plate may be used, for example. The KTP crystal 10 may be cut at a type II phase-matched angle. According to the configuration for disposing such that the polarization direction of the polarization element 12 forms an angle of 45 degrees relative to an optical axis of the KTP crystal 10, since nonlinear optical effect is affected by two (2) equal-intensity fundamental wave light components which are apparently orthogonal on a coordinate system of the KTP crystal 10, high-efficiency type II wavelength conversion is enabled and the stable and high-power long-pulse second harmonic pulse laser beam can be generated.

Figure 3:
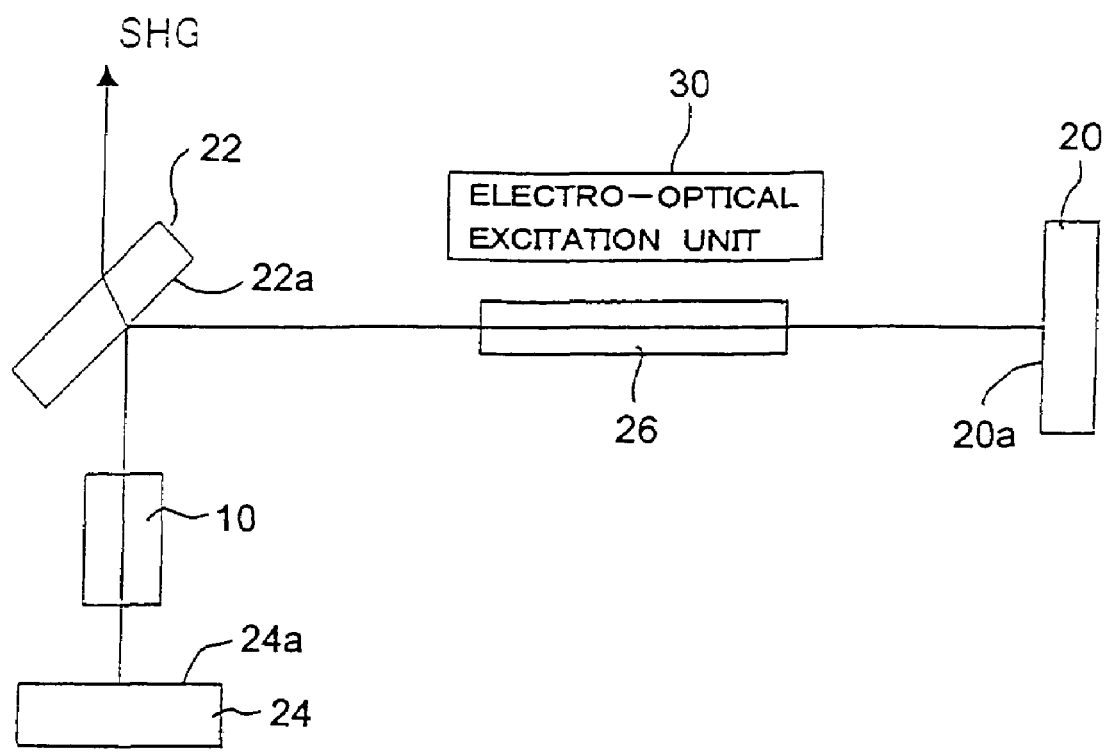
FIG. 3 shows a configuration of a principal part of a harmonic pulse laser apparatus according to one embodiment of the present invention.
Figure 4:
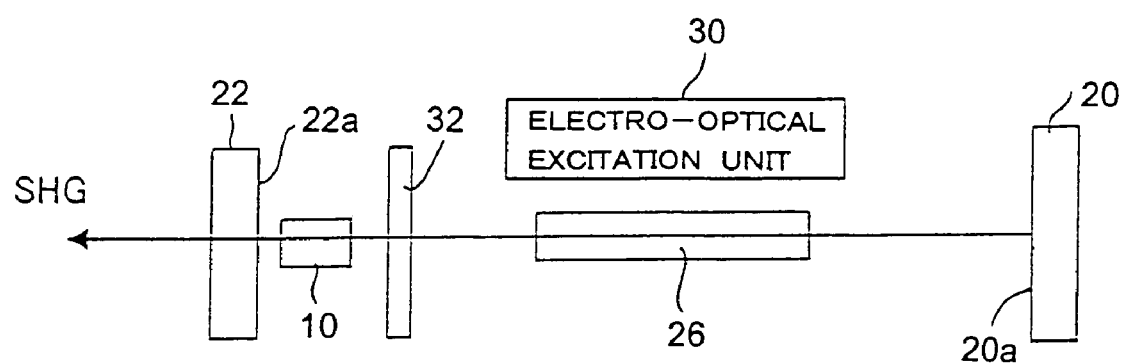
FIG. 4 shows a configuration of a principal part of a harmonic pulse laser apparatus according to another embodiment of the present invention.
Figure 5:
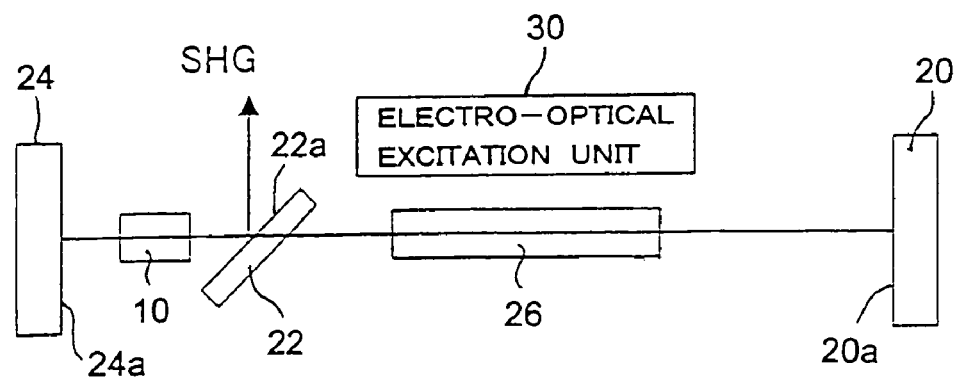
FIG. 5 shows a configuration of a principal part of a harmonic pulse laser apparatus according to another embodiment of the present invention.

Then, referring to FIG. 3 to FIG. 5, a basic configuration (especially, a resonator configuration) is described for the harmonic pulse laser apparatus in the embodiments of the present invention.

First Embodiment

FIG. 3 shows a configuration of a principal part of a harmonic pulse laser apparatus according to one embodiment. This apparatus has a filded or triangular form optical resonator. More specifically, three (3) mirrors 20, 22, 24 are arranged in the triangular form; a solid-state laser active medium, for example, Nd:YAG rod 26 is disposed on a beam path between an intermediate mirror 22 and one of end mirrors 20; and a KTP crystal 10 is disposed on a beam path between the intermediate mirror 22 and the other end mirror 24. Both end mirrors 20 and 24 are optical resonator mirrors which have high reflectivity to the fundamental wavelength (e.g. 1064 nm) and are arranged optically opposed to each other via the intermediate mirror 22. The intermediate mirror 22 is a harmonic separator output mirror for outputting the second harmonic pulse laser beam to the outside of the resonator.

The active medium 26 is optically pumped by an electro-optic excitation unit 30. The electro-optic excitation unit 30 has an excitation light source (e.g. an excitation lamp or laser diode) for generating excitation light toward the active medium 26 and, by lighting and driving the excitation light source with long-pulse excitation currents, the active medium 26 is continuously pumped during a period of the long pulse.

The fundamental wavelength light beam reflected from one of the end mirrors 20 is transmitted therethrough the active medium 26 and injected to the harmonic separator output mirror 22. A principal surface 22a of the harmonic separator output mirror 22 is coated with a film which has high reflectivity to 1064 nm, and the fundamental wavelength light beam is reflected from the reflection film, is transmitted therethrough the KTP crystal 10 and injected to the other end mirror 24. Then, the fundamental wavelength light beam reflected from the other end mirror 24 is transmitted therethrough the KTP crystal 10, is injected to the harmonic separator output mirror 22, is again reflected and returned to the active medium 26, is transmitted therethrough the active medium 26 and injected to one of the end mirrors 20. In this way, the fundamental wavelength light beam generated by the active medium 26 is confined and amplified between both end mirrors (optical resonator mirrors) 22 and 24 via the harmonic separator output mirror 22.

The KTP crystal 10 is optically coupled with the fundamental mode excited by this optical resonator and generates a long-pulse second harmonic pulse laser beam SHG due to nonlinear interaction with long-pulse fundamental wavelength. The principal surface 22a of the harmonic separator output mirror 22 is coated with a film which does not reflect 532 nm and, when the second harmonic light beam SHG from the KTP crystal is injected to the harmonic separator output mirror 22, the light beam is transmitted therethrough the mirror 22 and is output to the outside of the resonator. Also, a principal surface 24a of the terminal mirror 24 is coated with a film which has reflectivity to 532 nm, and the second harmonic light beam SHG from the KTP crystal 10 is reflected by the end mirror 24. Then, the second harmonic light beam SHG reflected by the end mirror 24 is transmitted therethrough the KTP crystal 10 and is further transmitted therethrough the harmonic separator output mirror 22 to be output to the outside. Results of the experiment conducted according to this embodiment are as follows.

Pulse laser power: 10.3 W @ 10 kHz
Stability: ±0.25% rms
1.74% pp
Response: 2.5 seconds at 95% rise time In this way, practically sufficient results are obtained for each of the laser power, stability and response. However, since the resonator has the triangular or L-shaped configuration, the footprint becomes large as one characteristic.

Second Embodiment

FIG. 4 shows a configuration of a principal part of a harmonic pulse laser apparatus according to another embodiment. In this apparatus, the end mirror 20, the harmonic separator output mirror 22, the active medium 26 and the KTP crystal 10 are arranged in the same straight line. More specifically, the active medium 26 is disposed nearer to the end mirror 20 and the KTP crystal 10 is disposed nearer to the harmonic separator output mirror 22. A principal surface 20a of the end mirror 20 is coated with a film which has high reflectivity to the fundamental wavelength (1064 nm). The principal surface 22a of the harmonic separator output mirror 22 is coated with a film which has high reflectivity to the fundamental wavelength (1064 nm) and a film which does not reflect the second harmonic (532 nm). Between the KTP crystal 10 and the active medium 26, a harmonic mirror 32 is disposed facing to the harmonic separator output mirror 22, and a principal surface 32a of the harmonic mirror 32 is coated with a film which does not reflect the fundamental wavelength (1064 nm) and a film which has reflectivity to the second harmonic (532 nm).

In this apparatus configuration, the fundamental wavelength light beam generated by the active medium 26 is confined and amplified between the end mirror 20 and the harmonic separator output mirror 22. In this way, the harmonic separator output mirror 22 acts also as the optical resonator mirror. The KTP crystal 10 is optically coupled with the fundamental mode excited by this optical resonator and generates the long-pulse second harmonic pulse laser beam SHG due to nonlinear interaction with long-pulse fundamental wavelength. When the second harmonic light beam SHG from the KTP crystal 10 is injected to the higher harmonic separate output mirror 22, the second harmonic light beam SHG is transmitted therethrough the mirror 22 and is output to the outside of the resonator. The second harmonic light beam SHG reflected by the harmonic mirror 32 is returned to the KTP crystal 10, transmitted therethrough the KTP crystal 10, further transmitted therethrough the harmonic separator output mirror 22 and output to the outside of the resonator. This apparatus configuration has an advantage that the footprint can be made smaller. Results of the experiment conducted according to this embodiment are as follows.

Pulse laser power: 10.3 W @ 10 kHz
Stability: ±0.63% rms
2.53% pp
Response: 11.5 seconds at 95% rise time In this way, although the laser power is sufficient, the stability and response are low as one characteristic.

Third Embodiment

FIG. 5 shows a configuration of a principal part of a harmonic pulse laser apparatus according to another embodiment. In this apparatus, the end mirrors 20 and 24, the harmonic separate output mirror 22, the active medium 26 and the KTP crystal 10 are arranged in the same straight line. More specifically, the active medium 26 is disposed nearer to the end mirror 20; the KTP crystal 10 is disposed nearer to the end mirror 24; and the harmonic separator output mirror 22 is disposed between the KTP crystal 10 and the active medium 26. However, the harmonic separator output mirror 22 is disposed such that an oblique angle, for example, 45 degrees is formed relative to an optical axis of the resonator. The principal surface of the harmonic separator output mirror 22, i.e., a surface 22a on the side of the KTP crystal is coated with a film which does not reflect the fundamental wavelength (1064 nm) and a film which has reflectivity to the second harmonic (532 nm).

In this apparatus configuration, the fundamental wavelength light beam generated by the active medium 26 is confined and amplified between the terminal mirror 20 and 24. The KTP crystal 10 is optically coupled with the fundamental mode excited by this optical resonator and generates the long-pulse second harmonic pulse laser beam SHG due to nonlinear interaction with the long-pulse fundamental wavelength. When the second harmonic light beam SHG from the KTP crystal 10 is injected to the harmonic separator output mirror 22, the second harmonic light beam SHG is reflected in an oblique direction (which is an orthogonal direction relative to the optical axis of the resonator) and is output to the outside of the resonator. The second harmonic light beam SHG reflected by the end mirror 24 is returned to the KTP crystal 10, transmitted therethrough the KTP crystal 10, reflected by the harmonic separator output mirror 22 and output to the outside of the resonator. This apparatus configuration also has an advantage in that the footprint can be made smaller. Results of the experiment conducted according to this embodiment are as follows.

Pulse laser power: 10.2 W @ 10 kHz
Stability: ±0.29% rms
2.07% pp
Response: 3.5 seconds at 95% rise time In this way, each of the laser power, stability and response is good. In other words, the footprint is as small as the apparatus configuration of the FIG. 4 and the laser power, stability and response are comparable to the apparatus configuration of FIG. 3.

In the apparatus configurations of FIG. 3 to FIG. 5, if the wavelength conversion method of FIG. 2 is applied, the polarization element 12 may be disposed at an appropriate position on the light path within the resonator, for example, between the active medium 26 and the KTP crystal 10.

Figure 6:
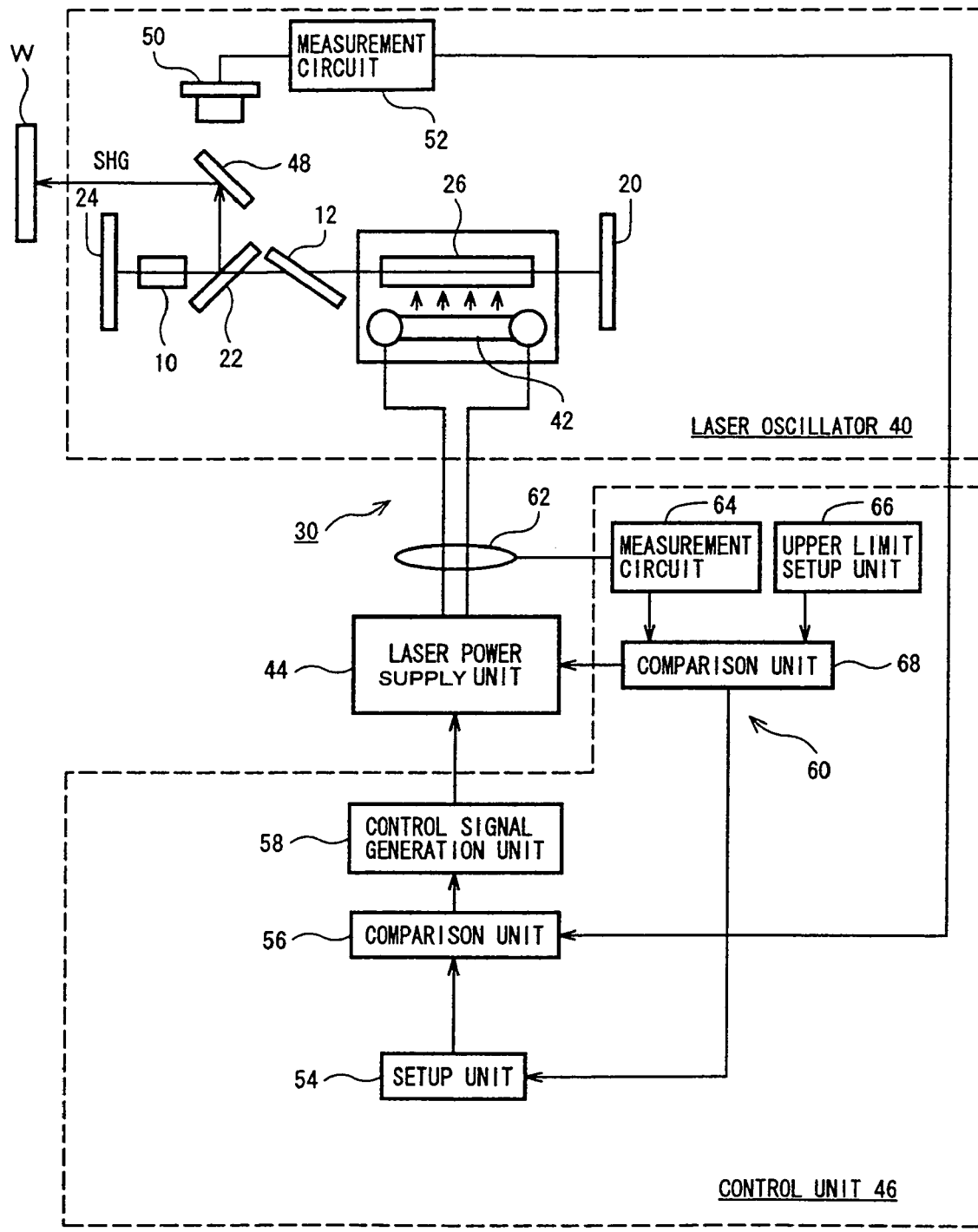
FIG. 6 shows a configuration of a laser welding apparatus according to an embodiment of the present invention.
Figure 7:
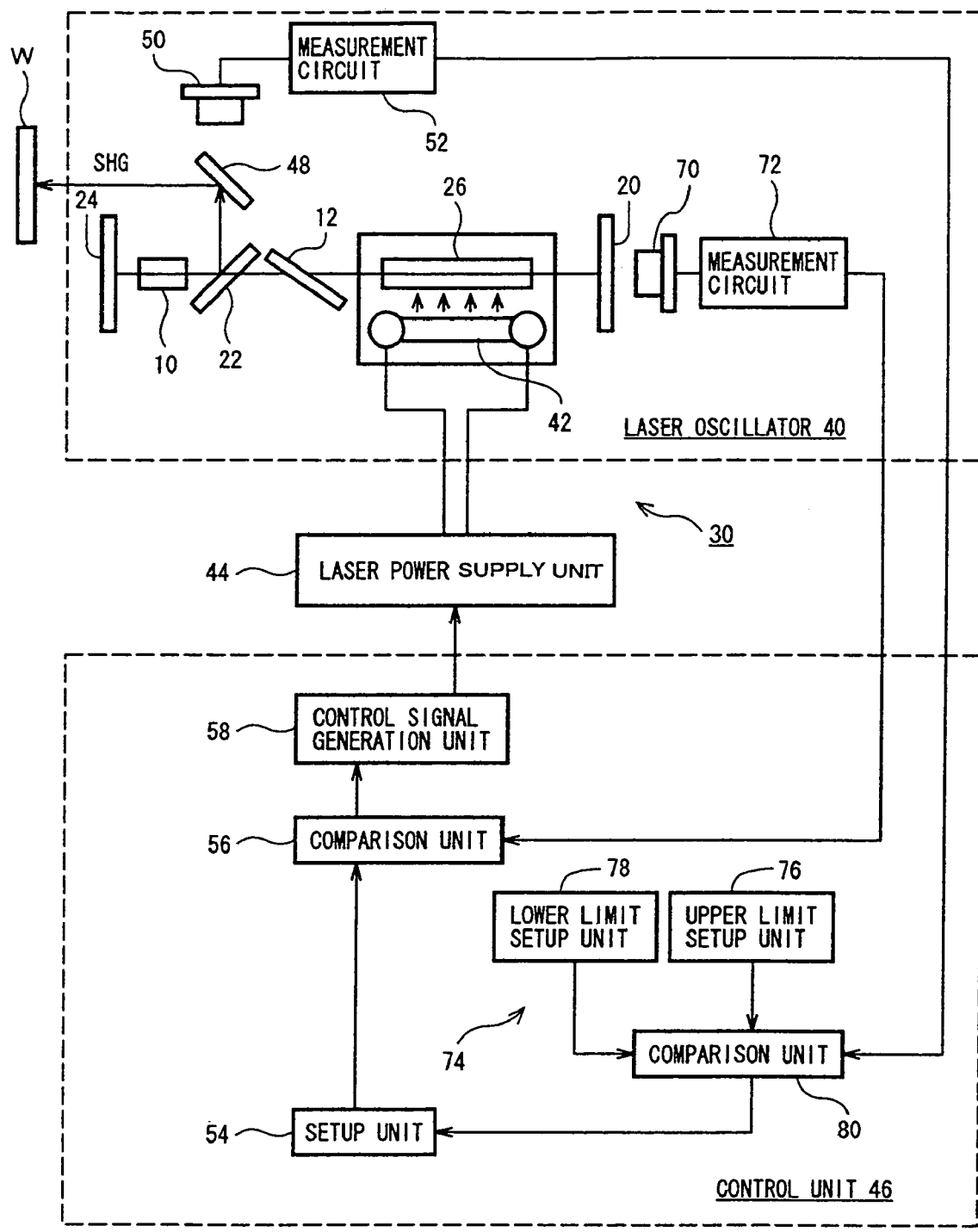
FIG. 7 shows a configuration of a laser welding apparatus according to another embodiment of the present invention.
Figure 8:
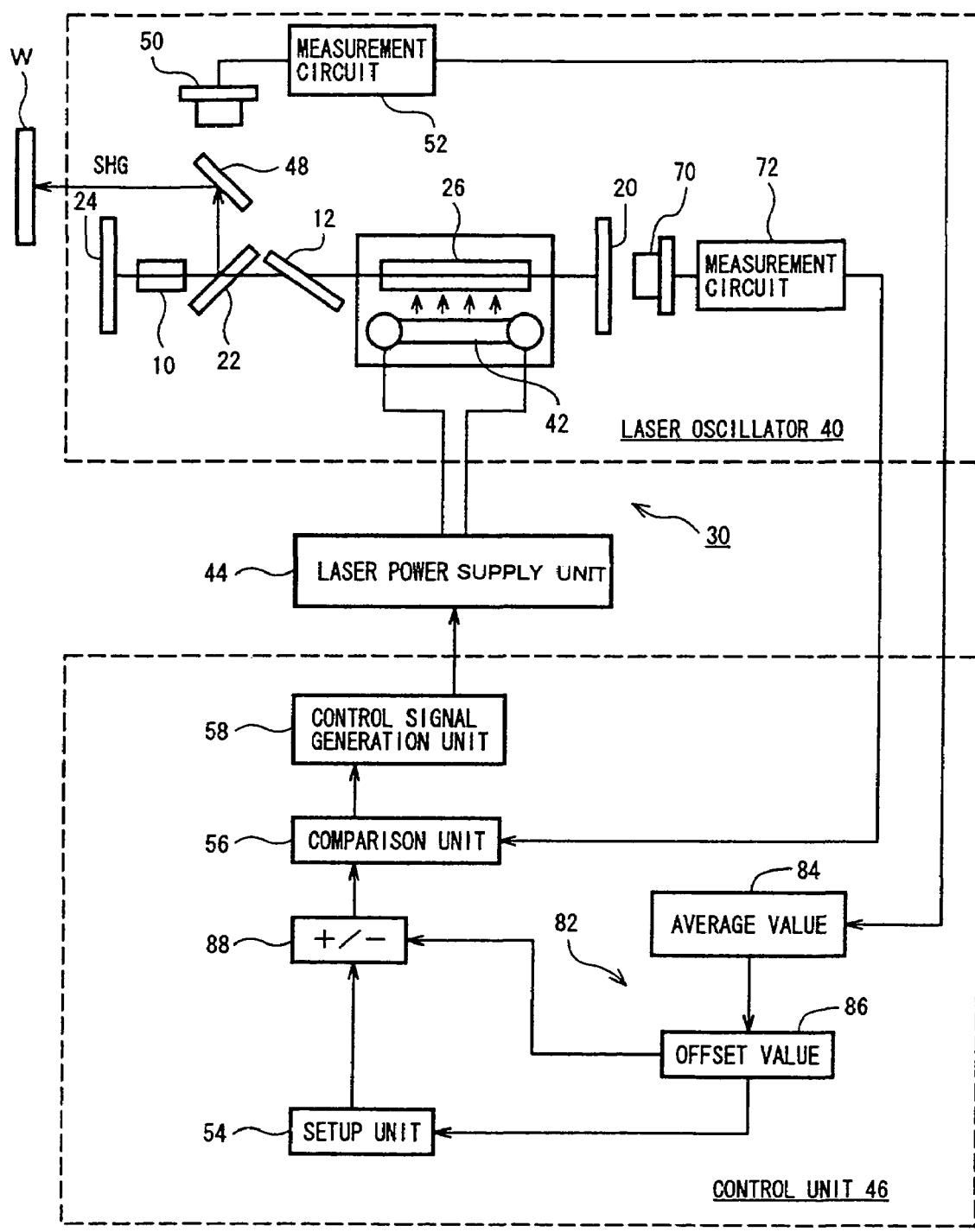
FIG. 8 shows a configuration of a laser welding apparatus according to another embodiment of the present invention.

Then, referring to FIG. 6 to FIG. 8, embodiments are described for a laser welding apparatus incorporating the harmonic pulse laser apparatus of the present invention.

Fourth Embodiment

FIG. 6 shows a configuration of a laser welding apparatus according to an embodiment of the present invention. The laser welding apparatus has a laser oscillator 40 including the resonator of the harmonic pulse laser apparatus (of the embodiment of FIG. 5) of the present invention, a laser power supply unit 44 supplying electric power (or excitation currents) to an excitation light source 42 of an electro-optic excitation unit 30 provided within the laser oscillator 40 and a control unit 46 for controlling the electric power supplied to the excitation light source 42 from the laser power supply unit 44. Although the workpiece W may be any metal, a great advantage can be obtained especially when the material W is copper, gold or aluminum.

In the laser oscillator 40, the long-pulse second harmonic pulse laser beam SHG output to the outside of the resonator by the harmonic separator output mirror 22 is radiated to the workpiece W through an optical system not shown (e.g. fiber optics, convergence lens and the like) after an optical axis thereof is bent by a bent mirror 48. Behind the bent mirror 48, a light-sensitive element or a photo sensor 50 is disposed for receiving the harmonic light leaked to the back of the bent mirror 48, in order to measure the laser output power of the second harmonic pulse laser beam SHG. A measurement circuit 52 generates an electric signal (laser output power measurement signal) representing a laser output power measurement value of the second harmonic pulse laser beam SHG based on the output signal of the photo sensor 50. The laser output power measurement signal is sent to a comparison unit 56 of a control unit 46 described later. The measurement circuit 52 may be positioned in any place and, of course, may be positioned outside the laser oscillator 40.

As the laser power supply unit 44, any power supply can be used as long as pulsed lighting of the excitement light source can be achieved. Nevertheless, preferred laser power supply unit 44 can arbitrarily control pulse waveforms. For example, the laser power supply unit 44 may have a configuration which is comprised of a direct-current power source unit generating a direct current from an alternate current with a commercial frequency, which connects a switching element between the direct-current power source unit and the excitation light source 42 and which makes the switching element perform a switching operation at high frequency with the control signal from the control unit 46.

The control unit 46 is comprised of a setup unit 54, a comparison unit 56 and a control signal generation unit 58 in order to perform power feedback control for the second harmonic pulse laser beam SHG. The setup unit 54 sets various condition values, reference values and the like for the long-pulse feedback control depending on given laser processing conditions. The comparison unit 56 compares the laser power measurement value signal from the measurement circuit 52 with a reference pulse waveform set value from the setup unit 54 to output an error signal representing a comparison error. The control signal generation unit 58 generates the control signal, for example, in the pulse width modulation (PWM) method, depending on the comparison error from the comparison unit 56, and performs switching control for the switching element within the laser power supply unit 44 with the generated control signal.

In this embodiment, if deterioration over time, optical misalignment or the like somewhat occurs within the laser oscillator 40, the workpiece W can be radiated by the long-pulse second harmonic pulse laser beam with the laser power that has been set to conduct good welding processing.

Nevertheless, when the direction (angle) of the KTP crystal 10 becomes out of alignment, even if the laser power of the fundamental wave pulse laser beam is normal, the laser power of the second harmonic pulse laser beam SHG may be fluctuated or reduced. In this case, if the SHG power feedback control works too strongly, the laser power of the fundamental wave pulse laser beam will be excessively increased and the KTP crystal 10 may be destructed.

In this embodiment, an input electric power monitor mechanism 60 is provided for avoiding these destructive accidents. The monitor mechanism 60 consists of, for example, a sensor 62 and a measurement circuit 64 for measuring electric power supplied to the excitation light source from the laser power supply unit 44, an upper limit setup unit 66 for setting an upper limit of the input electric power and a comparison unit 68. The comparison unit 68 compares an input electric power measurement value obtained from the measurement circuit 64 with an input electric power upper limit value from the upper limit setup unit 66 and outputs a comparison result representing a major and minor relationship (or an error) of both values. When the input electric power measurement value exceeds or is likely to exceed the upper limit, the SHG power feedback control can be limited by a software limiter of a setup unit 54 or by a hardware limiter of the laser power supply unit 44, in response to the output from the comparison unit 68. With these input electric power limiter functions using the input electric power monitor mechanism 60, undesirable damages of the KTP crystal 10 caused by the SHG power feedback control can be prevented. Instead of the input electric power, a configuration can be enabled for monitoring the excitation current or voltage supplied to the excitation light source 42.

Fifth Embodiment

FIG. 7 shows a configuration of a laser welding apparatus according to another embodiment of the present invention. In this figure, the same symbols are added to the portions which have substantially the same configurations or functions as the laser welding apparatus of FIG. 6.

In the laser oscillator 40, the laser power of the fundamental wave pulse laser beam is overwhelmingly higher (ten (10) times or higher) than the laser power of the second harmonic pulse laser beam SHG. In this embodiment, for example, by providing a light-sensitive element or a photo sensor 70 receiving the fundamental wave light leaked to the back of the terminal mirror 20, the laser output power of the fundamental wave pulse laser beam is measured with a measuring circuit 72 based on an output signal from the photo sensor 70, and a fundamental wave laser power measurement value signal from the measurement circuit 72 is fed back to the comparison unit 56. In accordance with such fundamental wave power feedback control, since the laser power of the fundamental wave pulse laser beam can be controlled steadily and instantaneously, if the KTP crystal 10 has an abnormality for example, the input electric power, i.e., electric power or excitation currents supplied to the excitation light source 42 does not have to be increased and secondary failures are not likely to happen.

Nevertheless, if the fundamental wave power feedback control functions normally, the power of the second harmonic pulse laser beam SHG may be abnormally fluctuated by angular deviance or temperature abnormality of the KTP crystal 10. In order to address this problem, in this embodiment, an SHG monitor unit 74 is provided. In this SHG monitor unit 74, an upper limit setup unit 76 and a lower limit setup unit 78 set an upper limit and a lower limit for the laser power of the second harmonic pulse laser beam SHG respectively. The comparison unit 80 compares an SHG laser power measurement value obtained from the photo sensor 50 and the measurement circuit 52 to output a comparison result. When the SHG laser power measurement value goes, or is likely to go, outside of the range of the upper limit or the lower limit, the fundamental wave power feedback control will be subjected to a software correction or limiter of the setup unit 54, or an action will be taken for suspension.

Sixth Embodiment

FIG. 8 shows a configuration of a laser welding apparatus according to another embodiment of the present invention. In this figure, the same symbols are added to the portions which have substantially the same configurations or functions as the laser welding apparatus of FIG. 6 or FIG. 7.

Also in this embodiment, the fundamental wave power feedback mechanism is provided, which is similar to the embodiment of FIG. 7. However, a SHG monitor unit 82 has an average value calculation circuit 84 and an offset value calculation circuit 86. Also, an offset correction circuit 88 is provided between the setup unit 54 and the comparison unit 56 in the feedback control system. The average value calculation circuit 84 finds an average value of SHG laser power measurement values obtained from the photo sensor 50 and the measurement circuit 52 for any time period. The offset value calculation circuit 86 finds a difference or offset value $\pm \alpha$ between the SHG laser power average value found in the average value calculation circuit 84 and a desirable setup value (or previous average value) for the SHG laser power. This offset value $\pm \alpha$ is fed back as a control offset value to the control unit of the fundamental wave power feedback mechanism.

Again, in this scheme, while performing the fundamental wave power feedback control, if the laser power of the second harmonic pulse laser beam SHG is decreased by variations over time such as angular deviance, temperature variation or burnt coating, appropriate correction can be timely applied through the SHG monitor unit 82.

Although the embodiments described above are mainly related to laser welding, the present invention can be applied to other physical processes, such as laser bending processing, laser thermal processing and other physical processes also, and is preferred for a wide variety of laser applications requiring heating.

While illustrative and presently preferred embodiments of the present invention have been described in detail herein, it is to be understood that the inventive concepts may be otherwise variously embodied and employed and that the present invention is intended to be construed to include such variations except insofar as limited by the prior art.

What is claimed is:

1. A harmonic pulse laser apparatus comprising:
    an optical resonator having an end mirror and a harmonic separator output mirror disposed optically opposed to each other;
    an active medium disposed on a light path of the optical resonator nearer to the end mirror than to the harmonic separator output mirror;
    an excitation unit for optically pumping the active medium so as to generate a fundamental wave pulse laser beam with a fundamental frequency that has a pulse width of 100 µs or longer;
    a KTP crystal disposed on the light path of the optical resonator nearer to the harmonic separator output mirror than to the end mirror so as to generate a second harmonic pulse laser beam having a frequency that is two (2) times the frequency of the fundamental wave pulse laser beam; and
    a harmonic mirror for allowing the fundamental wave pulse laser to be transmitted therethrough and for reflecting the second harmonic pulse laser beam, the harmonic mirror being disposed between the active medium and the KTP crystal, wherein
    the harmonic separator output mirror confines the fundamental wave pulse laser beam on the light path of the optical resonator and delivers the second harmonic pulse laser beam to the outside of the light path of the optical resonator.

2. A harmonic pulse laser apparatus, comprising:
    an optical resonator having a first end mirror and a second end mirror disposed optically opposed to each other;
    an active medium disposed on a light path of the optical resonator;
    an excitation unit for pumping the active medium so as to generate a fundamental wave pulse laser beam with a fundamental frequency that has a pulse width of 100 µs or longer, wherein the excitation unit includes
        an excitation light generation unit for generating an excitation light so as to optically pump the active medium,
        a laser power supply unit for supplying electric power to the excitation light generation unit to generate the excitation light, and
        a control unit for controlling the electric power supplied to the excitation light generation unit from the laser power supply unit;
    a KTP crystal disposed on the light path of the optical resonator so as to generate a second harmonic pulse laser beam having a frequency that is two (2) times the frequency of the fundamental wave pulse laser beam; and
    a harmonic separator output mirror disposed on the light path of the optical resonator, wherein the harmonic separator output mirror confines the fundamental wave pulse laser beam on the light path of the optical resonator and delivers the second harmonic pulse laser beam to the outside of the light path of the optical resonator,
    wherein the laser power supply unit includes a direct-current power source unit for outputting direct currents and a switching element connected between the direct-current power source unit and the excitation light generation unit, and wherein the laser power supply unit is operable to supply the excitation light generation unit with pulsed electric power by causing the switching element to perform a switching operation at high frequency during a period corresponding to the pulse width of the fundamental wave pulse laser beam.

3. A harmonic pulse laser apparatus, comprising:
    an optical resonator having a first end mirror and a second end mirror disposed optically opposed to each other;
    an active medium disposed on a light path of the optical resonator;
    an excitation unit for pumping the active medium so as to generate a fundamental wave pulse laser beam with a fundamental frequency that has a pulse width of 100 μs or longer, wherein the excitation unit includes
an excitation light generation unit for generating an excitation light so as to optically pump the active medium,
a laser power supply unit for supplying electric power to the excitation light generation unit to generate the excitation light, wherein the laser power supply unit includes a switching element, and
a control unit for controlling the electric power supplied to the excitation light generation unit from the laser power supply unit;
a KTP crystal disposed on the light path of the optical resonator so as to generate a second harmonic pulse laser beam having a frequency that is two (2) times the frequency of the fundamental wave pulse laser beam; and
a harmonic separator output mirror disposed on the light path of the optical resonator, wherein the harmonic separator output mirror confines the fundamental wave pulse laser beam on the light path of the optical resonator and delivers the second harmonic pulse laser beam to the outside of the light path of the optical resonator,
wherein the control unit supplies the laser power supply unit with a control signal for causing the switching element to perform a switching operation.

4. The harmonic pulse laser apparatus of claim 3, wherein the control unit is operable to generate the control signal in a pulse width control method.

5. The harmonic pulse laser apparatus of claim 3, wherein the control unit includes a harmonic laser output power measurement unit for measuring laser output power of the second harmonic pulse laser beam, and wherein the control unit is operable to generate the control signal by feeding back a laser output power measurement value obtained from the harmonic laser output power measurement unit.

6. The harmonic pulse laser apparatus of claim 3, wherein the control unit includes a fundamental wave laser output power measurement unit for measuring laser output power of the fundamental wave pulse laser beam, and wherein the control unit is operable to generate the control signal by feeding back a laser output power measurement value obtained from the fundamental wave laser output power measurement unit.

7. The harmonic pulse laser apparatus of claim 6, wherein the control unit includes:
a limit value setup unit for setting at least one of a desirable upper limit and lower limit of laser output power of the second harmonic pulse laser beam as a limit value;
a harmonic laser output power measurement unit for measuring the laser output power of the second harmonic pulse laser beam; and
a second comparison unit for comparing a laser output power measurement value obtained from the harmonic laser output power measurement unit with the limit value,
wherein the control unit is operable to control the electric power supplied to the excitation light generation unit from the laser power supply unit, depending on a comparison result of the second comparison unit.

8. The harmonic pulse laser apparatus of claim 6, wherein the control unit includes:

a reference value setup unit for setting a desirable reference value of the laser output power of the second harmonic pulse laser beam;
a harmonic laser output power measurement unit for measuring the laser output power of the second harmonic pulse laser beam;
a laser output power average value calculation unit for finding a temporal average value of the laser output power measurement values obtained from the harmonic laser output power measurement unit; and
an offset value calculation unit for finding a difference between a laser output power average value obtained from the laser output power average value calculation unit and the reference value as an offset value,
wherein the control unit is operable to correct the control signal depending on the offset value.

9. A harmonic pulse laser apparatus, comprising:
an optical resonator having a first end mirror and a second end mirror disposed optically opposed to each other;
an active medium disposed on a light path of the optical resonator;
an excitation unit for pumping the active medium so as to generate a fundamental wave pulse laser beam with a fundamental frequency that has a pulse width of 100 μs or longer, wherein the excitation unit includes
an excitation light generation unit for generating an excitation light so as to optically pump the active medium,
a laser power supply unit for supplying electric power to the excitation light generation unit to generate the excitation light, and
a control unit for controlling the electric power supplied to the excitation light generation unit from the laser power supply unit;
a KTP crystal disposed on the light path of the optical resonator so as to generate a second harmonic pulse laser beam having a frequency that is two (2) times the frequency of the fundamental wave pulse laser beam; and
a harmonic separator output mirror disposed on the light path of the optical resonator, wherein the harmonic separator output mirror confines the fundamental wave pulse laser beam on the light path of the optical resonator and delivers the second harmonic pulse laser beam to the outside of the light path of the optical resonator,
wherein the control unit includes
an upper limit setup unit for setting a desirable upper limit of a parameter selected from a group of electric power, current and voltage supplied to the excitation light generation unit from the laser power supply unit,
a parameter measurement unit for measuring the parameter, and
a first comparison unit for comparing a parameter measurement value obtained from the parameter measurement unit with the upper limit,
and wherein the control unit is operable to control the electric power supplied to the excitation light generation unit from the laser power supply unit, depending on a comparison result of the first comparison unit.

* * * * *